US012596134B2

(12) United States Patent
Kawano

(10) Patent No.: US 12,596,134 B2
(45) Date of Patent: Apr. 7, 2026

(54) DEVICE, MOVEMENT SPEED ESTIMATION SYSTEM, FEEDING CONTROL SYSTEM, MOVEMENT SPEED ESTIMATION METHOD, AND RECORDING MEDIUM IN WHICH MOVEMENT SPEED ESTIMATION PROGRAM IS STORED

(71) Applicant: NEC Corporation, Tokyo (JP)

(72) Inventor: Yoshitaka Kawano, Tokyo (JP)

(73) Assignee: NEC CORPORATION, Tokyo (JP)

( * ) Notice: Subject to any disclaimer, the term of this patent is extended or adjusted under 35 U.S.C. 154(b) by 972 days.

(21) Appl. No.: 17/784,160

(22) PCT Filed: Dec. 25, 2019

(86) PCT No.: PCT/JP2019/050800
§ 371 (c)(1),
(2) Date: Jun. 10, 2022

(87) PCT Pub. No.: WO2021/130893
PCT Pub. Date: Jul. 1, 2021

(65) Prior Publication Data
US 2023/0023743 A1    Jan. 26, 2023

(51) Int. Cl.
*G06T 7/246* (2017.01)
*G01P 3/38* (2006.01)
(Continued)

(52) U.S. Cl.
CPC .............. *G01P 3/38* (2013.01); *G06T 7/246* (2017.01); *G06T 7/60* (2013.01); *G06T 7/73* (2017.01);
(Continued)

(58) Field of Classification Search
CPC ... G01P 3/38; G06T 7/246; G06T 7/60; G06T 7/73; G06T 2207/10016; G06V 20/05; G06V 40/10; G06V 20/52; Y02A 40/81
See application file for complete search history.

(56) References Cited

U.S. PATENT DOCUMENTS

2013/0208943 A1      8/2013  Chuang et al.
2018/0132459 A1 *    5/2018  Baba ...................... A01K 79/02
(Continued)

FOREIGN PATENT DOCUMENTS

AU          2016421610 A1 *   4/2019   ............. G06T 7/269
AU          2019227780 A1 *  10/2020   ............. A01K 61/80
(Continued)

OTHER PUBLICATIONS

International Search Report for PCT Application No. PCT/JP2019/050800, mailed on Feb. 10, 2020.
(Continued)

*Primary Examiner* — Henok Shiferaw
*Assistant Examiner* — Woo C Rhim
(74) *Attorney, Agent, or Firm* — Sughrue Mion, PLLC

(57) ABSTRACT

A movement speed estimation device comprises: a body length calculation unit for calculating, from a video obtained by imaging an aquatic organism with a monocular camera, an apparent body length in the video of a specific portion of the aquatic organism; a movement amount calculation unit for calculating an apparent movement amount in the video of the aquatic organism in a predetermined period of the video; and an estimation unit for estimating the movement speed of the aquatic organism on the basis of the apparent body length and the apparent movement amount.

14 Claims, 8 Drawing Sheets

(51) Int. Cl.

| | |
|---|---|
| *G06T 7/60* | (2017.01) |
| *G06T 7/73* | (2017.01) |
| *G06V 20/05* | (2022.01) |
| *G06V 40/10* | (2022.01) |

(52) U.S. Cl.

CPC .............. *G06V 20/05* (2022.01); *G06V 40/10* (2022.01); *G06T 2207/10016* (2013.01)

(56)      References Cited

U.S. PATENT DOCUMENTS

| | | | |
|---|---|---|---|
| 2019/0277624 A1 * | 9/2019 | Kitagawa | .................. G06T 7/60 |
| 2020/0113158 A1 * | 4/2020 | Rishi | ..................... G06F 18/217 |
| 2020/0267947 A1 * | 8/2020 | Krossli | ................. A01K 61/95 |
| 2023/0023743 A1 * | 1/2023 | Kawano | ................ G06V 20/05 |

FOREIGN PATENT DOCUMENTS

| | | | | |
|---|---|---|---|---|
| JP | 2003250382 A | * | 9/2003 | |
| JP | 2004-089027 A | | 3/2004 | |
| JP | 2008-636509 A | | 9/2008 | |
| JP | 2018-078814 A | | 5/2018 | |
| WO | WO-2009008733 A1 | * | 1/2009 | ............. A01K 61/80 |
| WO | WO-2016023071 A1 | * | 2/2016 | .......... A01K 29/005 |
| WO | WO-2018042651 A1 | * | 3/2018 | ............. G06T 7/269 |
| WO | 2018/061925 A1 | | 4/2018 | |
| WO | WO-2019168108 A1 | * | 9/2019 | ............. A01K 61/80 |
| WO | WO-2019172363 A1 | * | 9/2019 | ............. A01K 61/95 |
| WO | WO-2019188506 A1 | * | 10/2019 | ............. A01K 61/95 |
| WO | WO-2019198611 A1 | * | 10/2019 | ............. A01K 61/00 |
| WO | WO-2019198701 A1 | * | 10/2019 | ............. G06Q 50/02 |
| WO | WO-2019232247 A1 | * | 12/2019 | ............. A01K 61/13 |
| WO | WO-2020046523 A1 | * | 3/2020 | ............. A01K 61/60 |

OTHER PUBLICATIONS

English translation of Written opinion for PCT Application No. PCT/JP2019/050800, mailed on Feb. 10, 2020.

\* cited by examiner

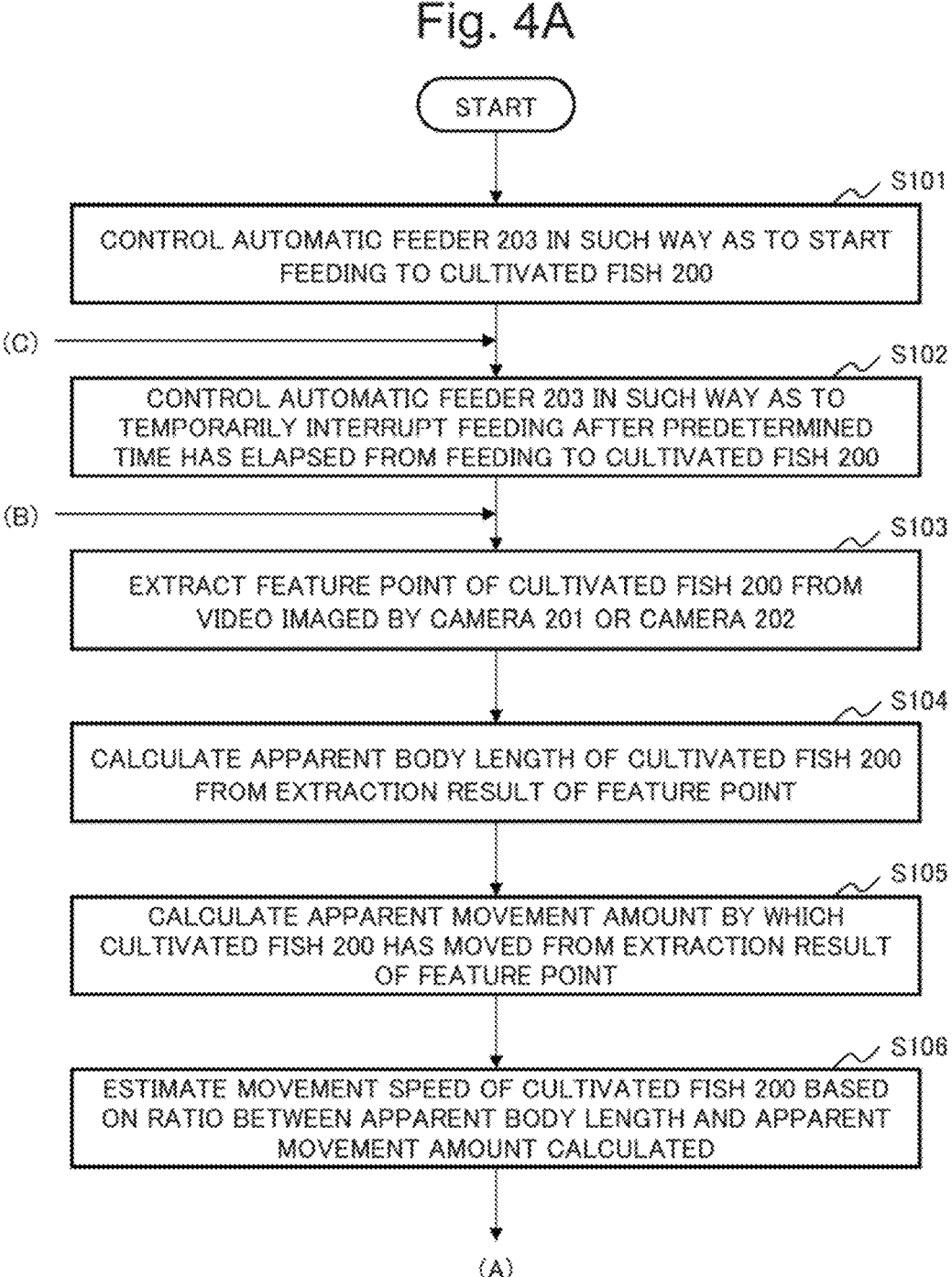

START

S101
CONTROL AUTOMATIC FEEDER 203 IN SUCH WAY AS TO START FEEDING TO CULTIVATED FISH 200

(C)

S102
CONTROL AUTOMATIC FEEDER 203 IN SUCH WAY AS TO TEMPORARILY INTERRUPT FEEDING AFTER PREDETERMINED TIME HAS ELAPSED FROM FEEDING TO CULTIVATED FISH 200

(B)

S103
EXTRACT FEATURE POINT OF CULTIVATED FISH 200 FROM VIDEO IMAGED BY CAMERA 201 OR CAMERA 202

S104
CALCULATE APPARENT BODY LENGTH OF CULTIVATED FISH 200 FROM EXTRACTION RESULT OF FEATURE POINT

S105
CALCULATE APPARENT MOVEMENT AMOUNT BY WHICH CULTIVATED FISH 200 HAS MOVED FROM EXTRACTION RESULT OF FEATURE POINT

S106
ESTIMATE MOVEMENT SPEED OF CULTIVATED FISH 200 BASED ON RATIO BETWEEN APPARENT BODY LENGTH AND APPARENT MOVEMENT AMOUNT CALCULATED (A)

Fig. 4B

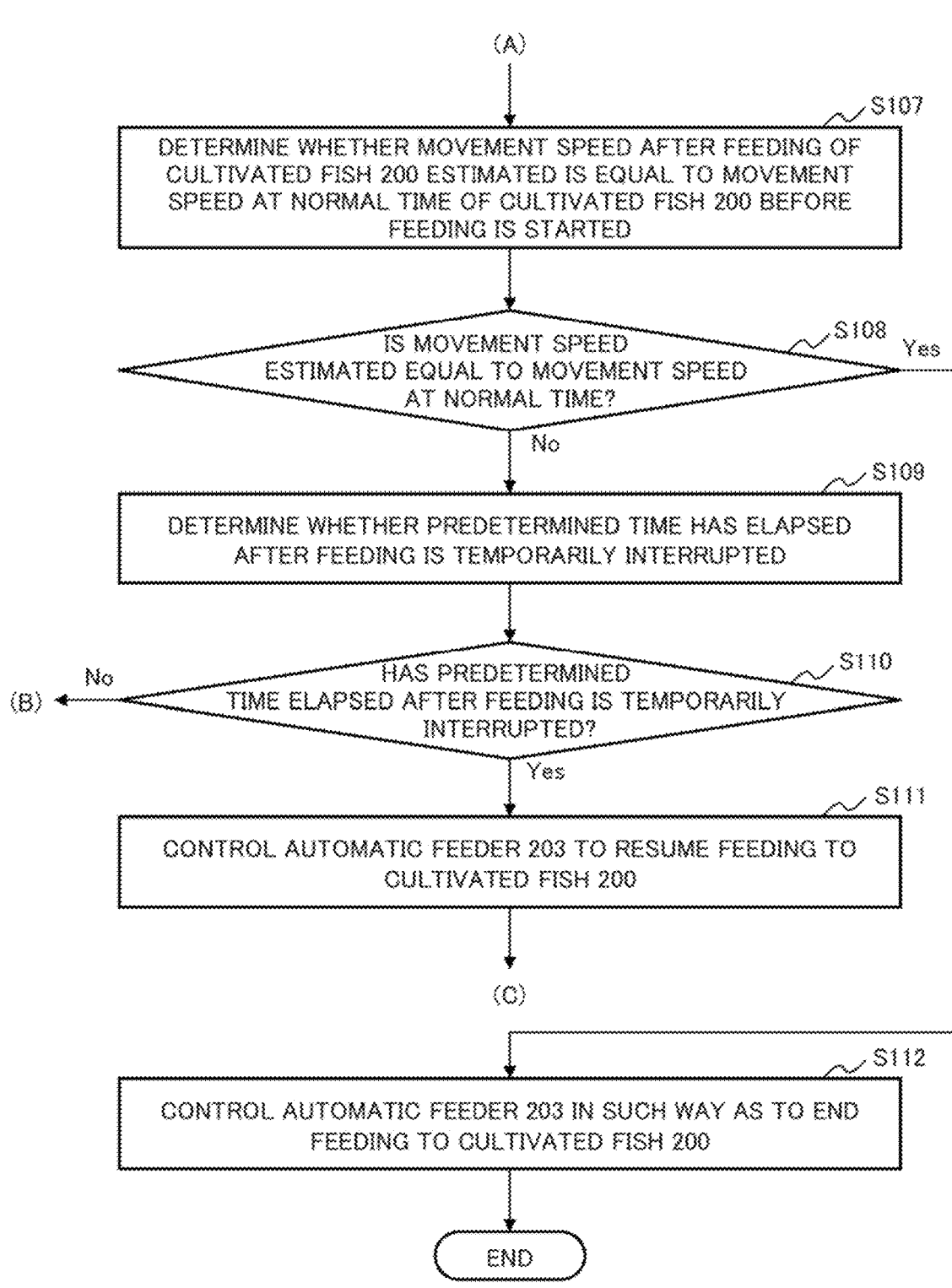

(A)

S107
DETERMINE WHETHER MOVEMENT SPEED AFTER FEEDING OF CULTIVATED FISH 200 ESTIMATED IS EQUAL TO MOVEMENT SPEED AT NORMAL TIME OF CULTIVATED FISH 200 BEFORE FEEDING IS STARTED

S108
IS MOVEMENT SPEED ESTIMATED EQUAL TO MOVEMENT SPEED AT NORMAL TIME?
Yes

No

S109
DETERMINE WHETHER PREDETERMINED TIME HAS ELAPSED AFTER FEEDING IS TEMPORARILY INTERRUPTED

S110
HAS PREDETERMINED TIME ELAPSED AFTER FEEDING IS TEMPORARILY INTERRUPTED?
No   (B)

Yes

S111
CONTROL AUTOMATIC FEEDER 203 TO RESUME FEEDING TO CULTIVATED FISH 200

(C)

S112
CONTROL AUTOMATIC FEEDER 203 IN SUCH WAY AS TO END FEEDING TO CULTIVATED FISH 200

END

Fig. 5

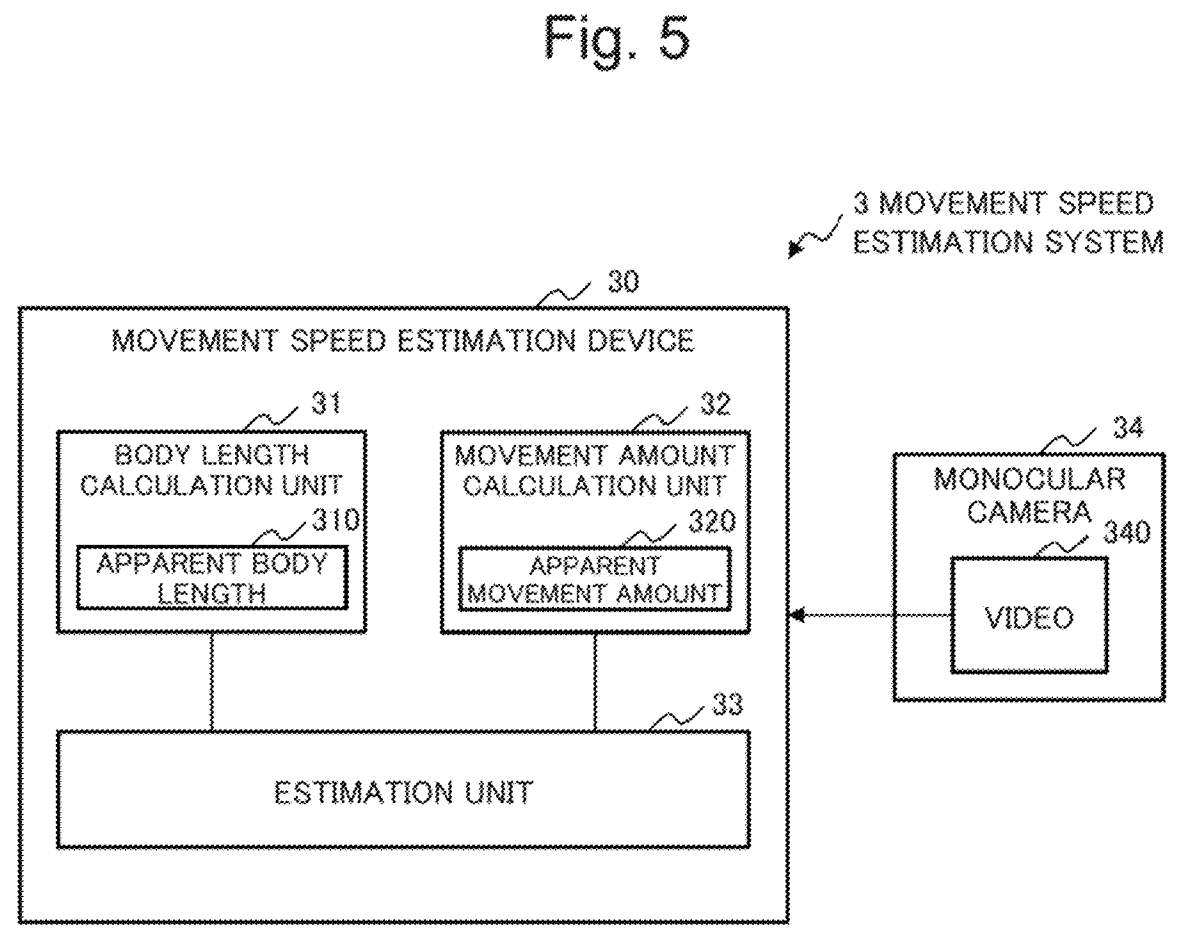

3 MOVEMENT SPEED ESTIMATION SYSTEM

30 MOVEMENT SPEED ESTIMATION DEVICE

31 BODY LENGTH CALCULATION UNIT

310 APPARENT BODY LENGTH

32 MOVEMENT AMOUNT CALCULATION UNIT

320 APPARENT MOVEMENT AMOUNT

33 ESTIMATION UNIT

34 MONOCULAR CAMERA

340 VIDEO

Fig. 7

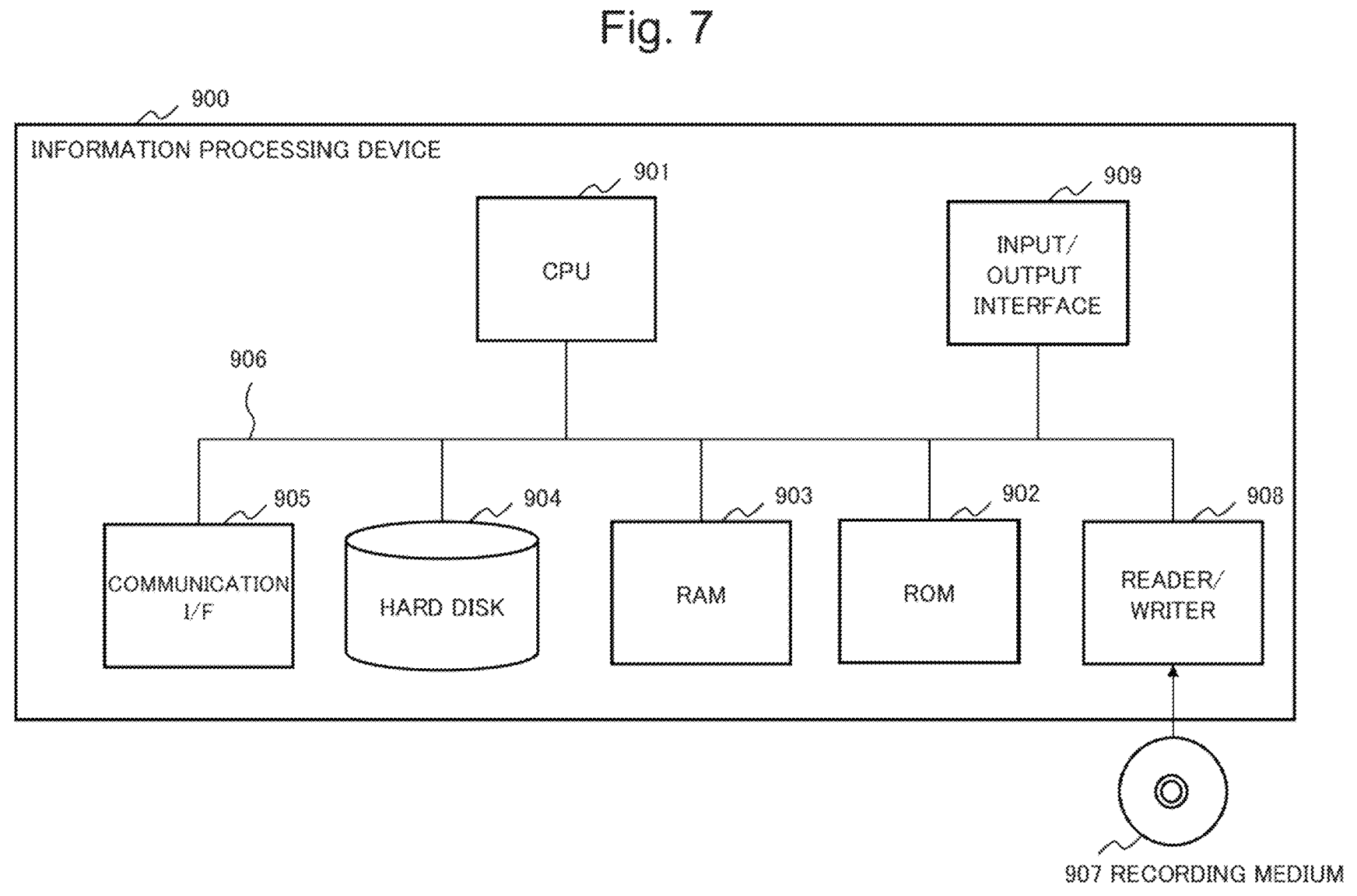

900 INFORMATION PROCESSING DEVICE

909 INPUT/OUTPUT INTERFACE

901 CPU

908 READER/WRITER

907 RECORDING MEDIUM

902 ROM

903 RAM

904 HARD DISK

906

905 COMMUNICATION I/F

DEVICE, MOVEMENT SPEED ESTIMATION SYSTEM, FEEDING CONTROL SYSTEM, MOVEMENT SPEED ESTIMATION METHOD, AND RECORDING MEDIUM IN WHICH MOVEMENT SPEED ESTIMATION PROGRAM IS STORED

This application is a National Stage Entry of PCT/JP2019/050800 filed on Dec. 25, 2019, the contents of all of which are incorporated herein by reference, in their entirety.

TECHNICAL FIELD

The present disclosure relates to a movement speed estimation device, a feeding determination device, a movement speed estimation system, a feeding control system, a movement speed estimation method, and a recording medium in which a movement speed estimation program is stored.

BACKGROUND ART

In the case of breeding and managing an aquatic organism such as cultivated fish, in order to achieve an optimal breeding environment, a technology for accurately grasping a state of the aquatic organism based on a video obtained by imaging the aquatic organism is expected.

As a technique related to such a technique, PTL 1 discloses a device that detects, from a photographed image in which an object to be measured is photographed, characteristic parts forming a pair in the object to be measured and each having a predetermined characteristic, and calculates a length between the characteristic parts forming a pair based on the detection result.

In addition, PTL 2 discloses a method for monitoring a growth state of an aquatic organism including an imaging device that vertically images a water tub from above the water tub and an imaging device that images a horizontal imaging region in the water tub from a side of the water tub. In this method, an aquatic organism is detected as a detection object from each photographed image, at least a two-dimensional position and a size of the detection object are obtained, and the two-dimensional coordinate system and a three-dimensional coordinate system in the water tub are associated with each other. In this method, a two-dimensional position and size of the detection object in the two-dimensional coordinate system obtained in each photographed image are converted into a three-dimensional position and size in the three-dimensional coordinate system. In this method, the three-dimensional position of the detection object is measured based on the three-dimensional position and size of the detection object in the three-dimensional coordinate system, movement of the detection object is tracked, and a behavior state is monitored.

In addition, PTL 3 discloses a cultivation system including a feeding device that feeds cultivated fish in a cage, a camera, and an image processing device that analyzes movement of an image indicated by image data acquired by the camera. The system stops feeding by the feeding device when an amount indicating the movement of the image becomes equal to or less than a predetermined amount during the feeding by the feeding device.

CITATION LIST

Patent Literature

[PTL 1] WO 2018/061925
[PTL 2] JP 2003-250382 A
[PTL 3] WO 2018/042651

SUMMARY OF INVENTION

Technical Problem

In the case of breeding and managing an aquatic organism such as cultivated fish, it is often necessary to grasp a movement speed when the organism moves in the water, which is one element representing the state of the organism. For example, in the technique disclosed in PTL 1 described above, although it is possible to obtain the movement speed of an aquatic organism by triangulation using a plurality of cameras, there is a problem that the cost of the system increases. In addition, since the technology disclosed in PTL 2 described above also requires a plurality of cameras similarly to PTL 1, there is a problem that the cost of the system increases. In addition, in the technique disclosed in PTL 3 described above, complicated processing using an optical flow is required, and there is a possibility that the accuracy of the obtained movement speed decreases due to influence of photographing equipment, photographing conditions, and the like. That is, it cannot be said that the techniques disclosed in PTLs 1 to 3 are sufficient to solve the problem of achieving estimation of an actual movement speed of an organism moving in the water with high accuracy from a video obtained by imaging the microorganism with a simple configuration.

One of the objects of the present disclosure is to achieve estimation of a movement speed of an aquatic organism with a simple configuration.

Solution to Problem

A movement speed estimation device according to an aspect of the present disclosure includes: a body length calculation unit for calculating, from a video obtained by imaging an aquatic organism with a monocular camera, an apparent body length in the video of a specific portion of the aquatic organism; a movement amount calculation unit for calculating an apparent movement amount in the video of the aquatic organism in a predetermined period of the video; and an estimation unit for estimating a movement speed of the aquatic organism based on the body length and the movement amount.

A movement speed estimation method according to another aspect of the present disclosure includes: calculating, from a video obtained by imaging an aquatic organism with a monocular camera, an apparent body length in the video of a specific portion of the aquatic organism; calculating an apparent movement amount in the video of the aquatic organism in a predetermined period of the video; and estimating a movement speed of the aquatic organism based on the body length and the movement amount.

Furthermore, a movement speed estimation program according to still another aspect of the present disclosure causes a computer to execute: body length calculation processing of calculating, from a video obtained by imaging an aquatic organism with a monocular camera, an apparent body length in the video of a specific portion of the aquatic organism; movement amount calculation processing of calculating an apparent movement amount in the video of the aquatic organism in a predetermined period of the video; and estimation processing of estimating a movement speed of the aquatic organism based on the body length and the movement amount.

Furthermore, the present disclosure can also be implemented by a non-volatile computer-readable recording medium storing the movement speed estimation program (computer program).

Advantageous Effects of Invention

The present disclosure makes it possible to estimate a movement speed of an aquatic organism with a simple configuration.

BRIEF DESCRIPTION OF DRAWINGS

FIG. 2 is a diagram illustrating an image photographed by a camera 201 according to a first example embodiment of the present disclosure, an apparent body length of a cultivated fish 200 calculated by a first calculation unit 11, and an apparent movement amount by which the cultivated fish 200 has moved calculated by a second calculation unit 12.

FIG. 4A is a flowchart (1/2) illustrating an operation of a feeding determination device 100 according to a first example embodiment of the present disclosure.

FIG. 4B is a flowchart (2/2) illustrating an operation of a feeding determination device 100 according to a first example embodiment of the present disclosure.

FIG. 5 is a block diagram illustrating a configuration of a movement speed estimation system 3 according to a second example embodiment of the present disclosure.

FIG. 7 is a block diagram illustrating a configuration of an information processing device 900 capable of executing a movement speed estimation device 10 according to a first example embodiment of the present disclosure, a movement speed estimation device 30 according to a second example embodiment, or a feeding determination device 40 according to a third example embodiment.

EXAMPLE EMBODIMENT

Hereinafter, example embodiments of the present disclosure will be described in detail with reference to the drawings.

First Example Embodiment

Figure 1:
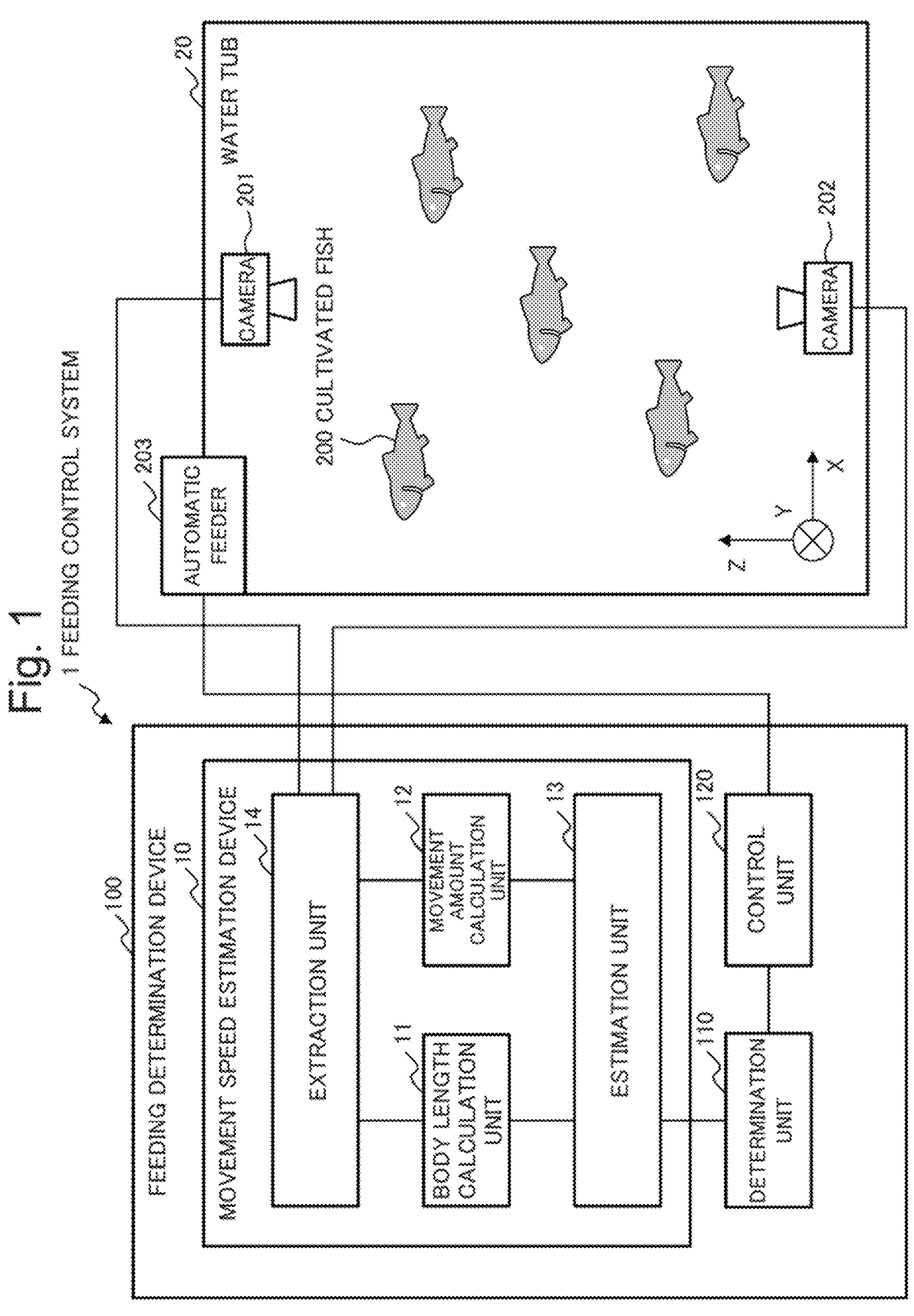
FIG. 1 is a block diagram illustrating a configuration of a movement speed estimation system 1 according to a first example embodiment of the present disclosure.

FIG. 1 is a block diagram illustrating a configuration of a feeding control system 1 according to a first example embodiment of the present disclosure. The feeding control system 1 according to the present example embodiment roughly includes a feeding determination device 100, cameras 201 and 202 that image one or more cultivated fish 200 bred in a water tub 20, and an automatic feeder 203 that feeds the cultivated fish 200. However, the automatic feeder 203 is an example of a feeder unit.

In the following description, the water tub 20 will be described with a three-dimensional (X-Y-Z) coordinate space appropriately shown in the drawings for convenience of description. Then, viewing (overlooking) in a negative direction of a Z axis is defined as "viewing from above", viewing in a positive direction of the Z axis is defined as "viewing from below", and viewing in a positive direction of a Y axis is defined as "viewing from front".

The camera 201 images an image of the cultivated fish 200 (aquatic organism) moving in the water tub 20 from above, and the camera 202 images an image of the cultivated fish 200 from below. The cameras 201 and 202 may be, for example, general monocular video cameras capable of imaging under water. The cameras 201 and 202 are communicably coupled to the feeding determination device 100, and transmit an imaged video (time-series images) to the feeding determination device 100. However, it is assumed that specifications such as the number of frames per unit time of the video are appropriately determined.

The automatic feeder 203 is communicably coupled to the feeding determination device 100, and feeds the cultivated fish 200 under the control of the feeding determination device 100.

The feeding determination device 100 is an information processing device such as a server or a personal computer that estimates an actual movement speed of the cultivated fish 200 based on the videos received from the cameras 201 and 202 and controls feeding by the automatic feeder 203 based on the estimation result.

The feeding determination device 100 includes a movement speed estimation device 10, a determination unit 110, and a control unit 120. The movement speed estimation device 10 includes a body length calculation unit 11, a movement amount calculation unit 12, an estimation unit 13, and an extraction unit 14. The body length calculation unit 11, the movement amount calculation unit 12, the estimation unit 13, the extraction unit 14, and the determination unit 110 are examples of a body length calculation unit, a movement amount calculation unit, an estimation unit, an extraction unit, and a determination unit in this order.

The extraction unit 14 extracts a plurality of feature points of the cultivated fish 200 from the videos obtained by imaging the cultivated fish 200 received from the cameras 201 and 202. Since an existing image recognition technique can be applied to the technique of extracting the feature point from the cultivated fish 200, a detailed description of the technique will be omitted in the present example embodiment. For example, the extraction unit 14 may extract the feature point from the cultivated fish 200 by using a learned model generated by machine learning. The extraction unit 14 extracts, for example, at least one of a head, a tail, an eye, and a fin of the cultivated fish 200 as a feature point.

The extraction unit 14 can use either the image received from the camera 201 or the image received from the camera 202 according to the position of the cultivated fish 200 in the water tub 20. That is, the extraction unit 14 may use the image received from the camera 201 when the cultivated fish 200 is located on an upper side of the water tub 20 (a side where a coordinate value of the Z axis is large), and may use the image received from the camera 202 when the cultivated fish 200 is located on a lower side of the water tub 20 (a side where a coordinate value of the Z axis is small). The extraction unit 14 may select any one of the image received from the camera 201 and the image received from the camera 202 based on the size of the cultivated fish in the image, for example. Note that in the following description according to the present example embodiment, for the convenience of description, it is assumed that the extraction unit 14 uses an image received from the camera 201. Note that the number of cameras included in the feeding control system 1 and the arrangement of the cameras in the water tub 20 are not limited to those described above.

The extraction unit 14 inputs information representing a position of the extracted feature point of the cultivated fish 200 to the body length calculation unit 11 and the movement amount calculation unit 12 in association with a frame (image) in the video. However, the information representing the position of the feature point is, for example, a value of XY coordinates of the feature point in an image that can be represented as an XY plane.

The body length calculation unit 11 calculates a length of a specific portion of the cultivated fish 200 in the XY plane based on the information representing the position of the feature point related to a certain image input from the extraction unit 14. In the present example embodiment, the length of the specific portion of the cultivated fish 200 in the XY plane is defined as an apparent body length of the cultivated fish 200.

The movement amount calculation unit 12 calculates a distance by which the cultivated fish 200 has moved in the XY plane based on the information representing the positions of the feature points regarding two frames included in the video, input from the extraction unit 14. In the present example embodiment, the movement distance of the cultivated fish 200 in the XY plane is defined as an apparent movement amount by which the cultivated fish 200 has moved.

Figure 2:
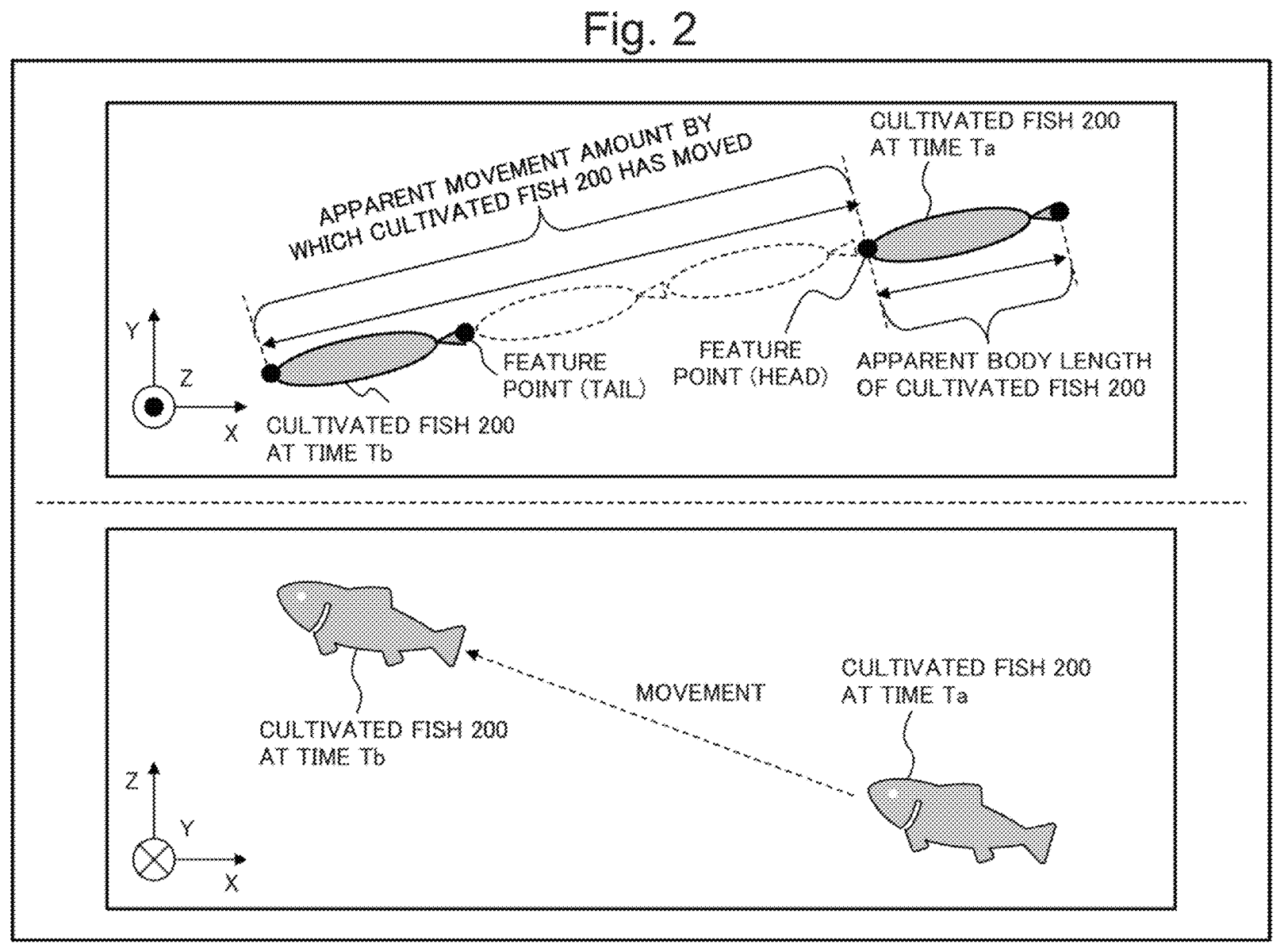

FIG. 2 is a diagram illustrating an image photographed by the camera 201 according to the present example embodiment, an apparent body length of the cultivated fish 200 calculated by the body length calculation unit 11, and an apparent movement amount by which the cultivated fish 200 has moved calculated by the movement amount calculation unit 12. However, for the convenience of description, FIG. 2 illustrates an image at a time Ta and an image at a time Tb (Tb>Ta) in an overlapping manner.

An upper view of FIG. 2 represents an image (XY plane image) photographed by camera 201, and a lower view of FIG. 2 represents a view (XZ plane view) of the water tub 20 as viewed from the front (in the positive direction of the Y axis) with respect to the photographed image. That is, in the example illustrated in the drawing, the cultivated fish 200 moves in the negative direction with respect to the X axis, in the negative direction with respect to the Y axis, and in the positive direction with respect to the Z axis between the time Ta and the time Tb.

In the example illustrated in FIG. 2, the extraction unit 14 extracts the head and the tail of the cultivated fish 200 as feature points. The body length calculation unit 11 calculates a length of a line segment connecting the head and the tail in an XY plane image as the apparent body length of the cultivated fish 200. Therefore, in this case, the apparent body length of the cultivated fish 200 calculated by the body length calculation unit 11 represents the body length of the cultivated fish 200 on the XY plane. In addition, for example, in a case where the extraction unit 14 extracts an eye and a fin of the cultivated fish 200 as feature points, the body length calculation unit 11 calculates a length of a line segment connecting the eye and the fin in an XY plane image as the apparent body length of the cultivated fish 200. Therefore, in this case, the apparent body length of the cultivated fish 200 calculated by the body length calculation unit 11 represents a length of a part of the cultivated fish 200 on the XY plane.

In the example illustrated in FIG. 2, the movement amount calculation unit 12 calculates the apparent movement amount by which the cultivated fish 200 has moved between the time Ta and the time Tb based on the XY coordinate value of the head of the cultivated fish 200 at the time Ta and the XY coordinate value of the head of the cultivated fish 200 at the time Tb. In addition, at this time, the movement amount calculation unit 12 may calculate the apparent movement amount by which the cultivated fish 200 has moved between the time Ta and the time Tb by using the XY coordinate values of the tail of the cultivated fish 200 at the times Ta and Tb.

In a case where the cultivated fish 200 swims in the water without bending the body, as illustrated in FIG. 2, the body length calculation unit 11 can calculate the apparent body length of the cultivated fish 200 from the positions of the two feature points of the cultivated fish 200. However, in a case where the cultivated fish 200 swims in the water while bending the body, for example, when the apparent body length of the cultivated fish 200 is calculated from the positions of the two feature points of the cultivated fish 200, the accuracy of the calculated apparent body length may decrease.

Figure 3:
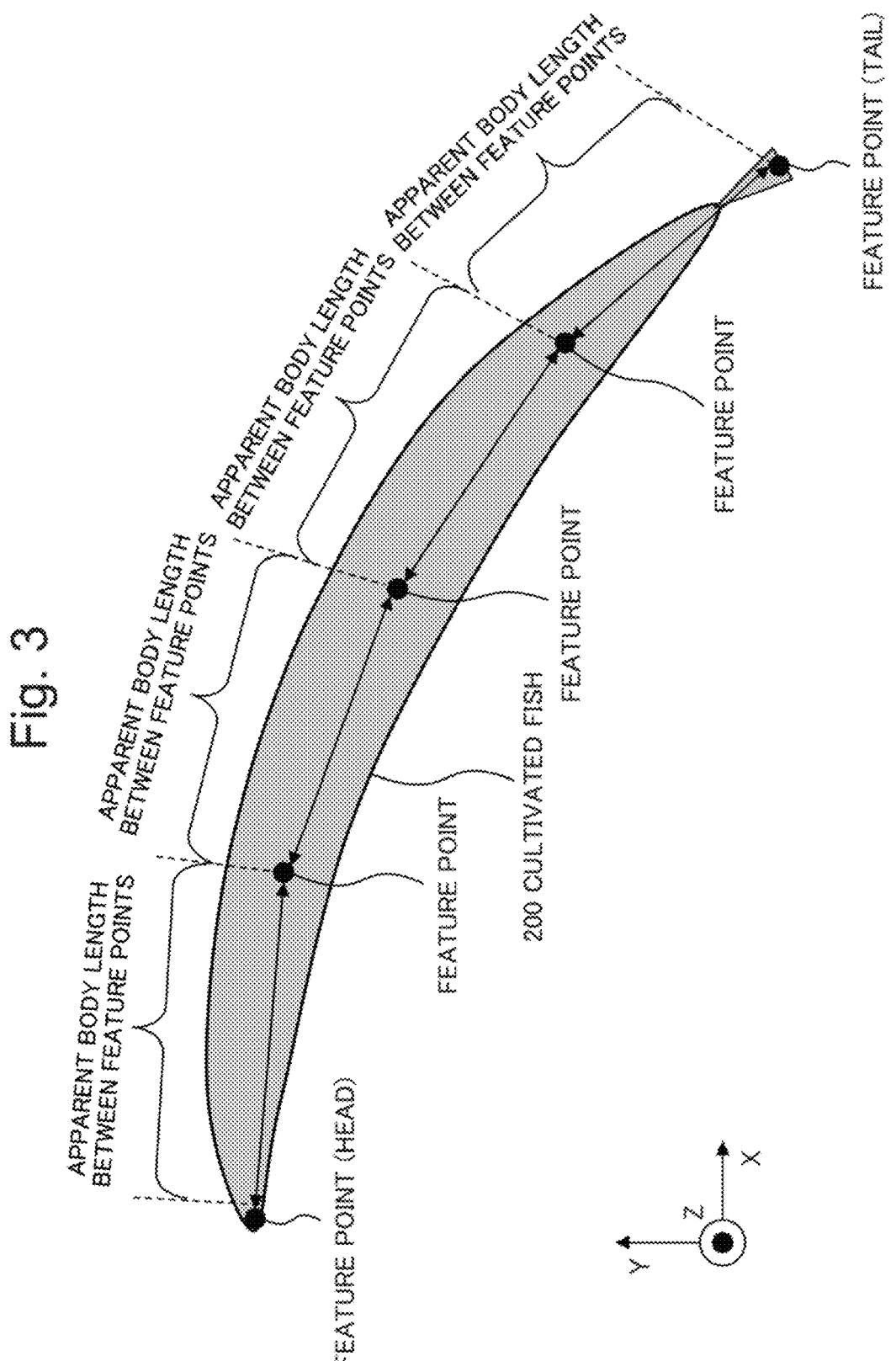
FIG. 3 is a diagram illustrating a plurality of feature points of a cultivated fish 200 extracted by an extraction unit 14 according to a first example embodiment of the present disclosure and an apparent body length between adjacent feature points calculated by a first calculation unit 11.

FIG. 3 is a diagram illustrating a plurality of feature points of the cultivated fish 200 extracted by the extraction unit 14 according to the present example embodiment and apparent body lengths between adjacent feature points calculated by the body length calculation unit 11 in a case where the cultivated fish 200 swims in the water while bending the body as described above. In the example illustrated in FIG. 3, the extraction unit 14 extracts five feature points arranged along a direction in which the body of the cultivated fish 200 is formed, and the body length calculation unit 11 calculates the apparent body lengths between adjacent feature points. Then, the body length calculation unit 11 calculates a total sum of the apparent body lengths between the adjacent feature points calculated as the apparent body length of the cultivated fish 200. Note that the number of feature points extracted by the extraction unit 14 is not limited to five.

In addition, when a posture of the cultivated fish 200 and an inclination with respect to the XY plane are different between the times Ta and Tb, the apparent body length of the cultivated fish 200 may be different between the times Ta and Tb. In this case, for example, the body length calculation unit 11 may calculate an average value of the apparent body length calculated from the image at the time Ta and apparent body length calculated from the image at the time Tb as the apparent body length of the cultivated fish 200.

The body length calculation unit 11 inputs the calculated apparent body length of the cultivated fish 200 to the estimation unit 13 illustrated in FIG. 1. The movement amount calculation unit 12 inputs the calculated apparent movement amount by which the cultivated fish 200 has moved to the estimation unit 13.

The estimation unit 13 estimates a movement speed of the cultivated fish 200 based on a ratio between the apparent body length of the cultivated fish 200 input from the body length calculation unit 11 and the apparent movement amount by which the cultivated fish 200 has moved input from the movement amount calculation unit 12.

In the case of the example illustrated in FIG. 2, the apparent movement amount by which the cultivated fish 200 has moved is three times the apparent body length of the cultivated fish 200. That is, in this case, assuming that a difference between the times Ta and Tb is a unit time (for example, one second), the estimation unit 13 estimates the movement speed of the cultivated fish 200 to be (three times the body length of the cultivated fish 200)/second. In a case where data representing an actual body length of the cultivated fish 200 (or an actual length of a specific portion related to the feature point extracted by the extraction unit) is given, the estimation unit 13 can estimate an actual movement speed of the cultivated fish 200 as a specific value. In the example illustrated in FIG. 2, for example, in a case where it is given that a body length of the cultivated fish 200 is one meter, the estimation unit 13 estimates the actual movement speed of the cultivated fish 200 to be three meters/second.

The estimation unit 13 outputs the estimation result of the actual movement speed of the cultivated fish 200 to the determination unit 110.

The determination unit 110 determines whether to end feeding to the cultivated fish 200 based on a movement speed of the cultivated fish 200 (the movement speed at the normal time) before the feeding to the cultivated fish 200 is started (that is, at the normal time) and a movement speed of the cultivated fish 200 after starting feeding to the cultivated fish 200 (that is, at the time of feeding).

It is known that when feeding is started, a movement speed of certain fish is faster than that in a normal time, and after the fish becomes satiated, the movement speed returns to the normal time. Examples of fish having such characteristic include mackerel, yellowtail, and tuna. The feeding determination device 100 according to the present example embodiment has a function of ending feeding to the cultivated fish 200 at an appropriate timing by using the characteristic of the fish described above.

The control unit 120 illustrated in FIG. 1 controls the execution of feeding to the cultivated fish 200 by the automatic feeder 203. After starting feeding to the cultivated fish 200, the control unit 120 controls the automatic feeder 203 to repeat interruption and resume of the feeding at predetermined time intervals. Then, the control unit 120 ends feeding to the cultivated fish 200 by the automatic feeder 203 in accordance with a determination result to be described later by the determination unit 110. The predetermined time interval is, for example, about 30 seconds, but is not limited thereto, and may be appropriately determined according to the type of the cultivated fish 200 and other conditions.

The movement speed at the normal time of the cultivated fish 200 is given to the determination unit 110. The movement speed at the normal time is, for example, a movement speed estimated by the estimation unit 13 while feeding is not being performed. The movement speed at the normal time may be a value represented by a ratio with respect to the body length of the cultivated fish 200 or the like, as described above.

The movement speed at the normal time is obtained as, for example, an average or a mode of the movement speeds of the plurality of cultivated fish 200, or an average or a mode when the movement speeds are obtained a plurality of times. The movement speed at the normal time is not limited to a specific value, and may be a value having a predetermined range.

After feeding of the cultivated fish 200 is started or the interrupted feeding is resumed, the determination unit 110 compares the movement speed at the time of feeding of the cultivated fish 200 input from the estimation unit 13 with the movement speed at the normal time of the cultivated fish 200. When the movement speed at the time of feeding is higher than the movement speed at the normal time, the determination unit 110 determines that the cultivated fish 200 is not yet in a satiated state, and inputs the determination result indicating that feeding is continued to the control unit 120.

In a case where the movement speed at the time of feeding is equal to the movement speed at the normal time, the determination unit 110 determines that the cultivated fish 200 is in a satiated state, and inputs the determination result indicating that the feeding ends to the control unit 120. At this time, even if the movement speed at the time of feeding and the movement speed at the normal time are not exactly the same value, for example, when a difference between these two movement speeds falls within a predetermined range, the determination unit 110 determines that these two movement speeds are equal to each other. The predetermined range may be, for example, a value determined from an average or a mode regarding the difference between the two movement speeds of the plurality of cultivated fish 200 or an average or a mode when the difference is obtained a plurality of times.

In addition, the feeding control system 1 according to the present example embodiment may not include the automatic feeder 203, and for example, feeding to the cultivated fish 200 may be manually performed by a breeding staff or the like. In that case, the determination unit 110 may present the determination result to the breeding staff or the like by using a display device, a voice output device, or the like (not illustrated in FIG. 1). More specifically, for example, in a case where feeding is continued, the determination unit 110 presents a character (for example, "feeding continuation"), a picture, or a voice indicating that feeding is to be continued to the breeding staff. For example, when ending feeding, the determination unit 110 presents a character (for example, "feeding end"), a picture, or a voice indicating that feeding is to be ended to the breeding staff. Note that, as the display device and the voice output device, for example, a portable terminal such as a smartphone or a tablet, a monitor installed at a position visible to the breeding staff, a speaker capable of outputting a voice audible to the breeding staff, or the like can be used.

In addition, the feeding determination device 100 or the movement speed estimation device 10 according to the present example embodiment may perform the above-described processing on the plurality of cultivated fish 200 bred in the water tub 20. In this case, the extraction unit 14 selects at least one of the plurality of cultivated fish 200 from the image obtained by imaging the cultivated fish 200, and extracts a feature point regarding each of the selected specific cultivated fish 200. The body length calculation unit 11 calculates an apparent body length of each of the specific cultivated fish 200. The movement amount calculation unit 12 calculates an apparent movement amount for each of the specific cultivated fish 200. Then, the estimation unit 13 estimates a movement speed for each of the specific cultivated fish 200.

In this case, the determination unit 110 determines to end feeding when the movement speed at the normal time for the plurality of cultivated fish 200 and the movement speed at the time of feeding after the feeding is started satisfy a criterion. As the criterion, for example, the determination unit 110 may use that a proportion of the cultivated fish 200 of which the movement speed at the normal time is equal to the movement speed at the time of feeding, among the plurality of cultivated fish 200, satisfies a criterion (for example, it is equal to or more than a threshold). The determination unit 110 may calculate an average value of the actual movement speeds at the time of feeding to the plurality of cultivated fish 200 as the criterion, and when the average value satisfies the criterion (for example, it is equal to or less than a threshold), the determination unit 110 may determine to end feeding. In this case, the fact that the average value of the movement speeds at the time of feeding is equal to or less than the threshold is substantially equal to the fact that the proportion of the cultivated fish 200 of which the movement speed returns to the actual movement speed at the normal time due to the satiated state becomes equal to or more than the threshold.

Next, the operation (processing) of the feeding determination device 100 according to the present example embodiment will be described in detail with reference to flowcharts of FIGS. 4A and 4B.

The control unit 120 controls the automatic feeder 203 in such a way as to start feeding the cultivated fish 200 at a predetermined time (step S101). The control unit 120 controls the automatic feeder 203 in such a way as to temporarily interrupt feeding after a predetermined time has elapsed from feeding the cultivated fish 200 (step S102).

The extraction unit 14 extracts a feature point of the cultivated fish 200 from a video imaged by the camera 201 or the camera 202 (step S103). The body length calculation unit 11 calculates an apparent body length of the cultivated fish 200 from the extraction result of the feature point by the extraction unit 14 (step S104). The movement amount calculation unit 12 calculates an apparent movement amount by which the cultivated fish 200 has moved, from the extraction result of the feature point by the extraction unit 14 (step S105).

The estimation unit 13 estimates a movement speed of the cultivated fish 200 based on a ratio between the apparent body length calculated by the body length calculation unit 11 and the apparent movement amount calculated by the movement amount calculation unit 12 (step S106). The determination unit 110 determines whether the movement speed after feeding of the cultivated fish 200 estimated by the estimation unit 13 is equal to a movement speed at the normal time of the cultivated fish 200 before the feeding is started (step S107).

In a case where the movement speed after feeding estimated by the estimation unit 13 is equal to the movement speed at the normal time (Yes in step S108), the control unit 120 controls the automatic feeder 203 in such a way as to end feeding to the cultivated fish 200 (step S112), and entire processing ends.

When the movement speed after feeding estimated by the estimation unit 13 is not equal to the movement speed at the normal time (No in step S108), the determination unit 110 determines whether a predetermined time has elapsed after the feeding is temporarily interrupted, by using a clocking function (step S109).

When the predetermined time has not elapsed after the feeding is temporarily interrupted (No in step S110), the processing returns to step S103. When the predetermined time has elapsed after the feeding is temporarily interrupted (Yes in step S110), the control unit 120 controls the automatic feeder 203 to resume feeding the cultivated fish 200 (step S111), and the processing returns to step S102.

The movement speed estimation device 10 according to the present example embodiment can estimate the movement speed of the aquatic organism with a simple configuration. This is because the movement speed estimation device 10 calculates the apparent body length of the cultivated fish 200 and the apparent movement amount by which the cultivated fish 200 has moved, in the video obtained by imaging the cultivated fish 200, and estimates the movement speed of the cultivated fish 200 based on the ratio between the apparent body length and the apparent movement amount.

Hereinafter, effects achieved by the movement speed estimation device 10 according to the present example embodiment will be described in detail.

In a case of breeding and managing an aquatic organism such as cultivated fish, it may be necessary to grasp a movement speed of the aquatic organism. As a technique for obtaining the movement speed, for example, there are a method of performing triangulation using a plurality of cameras, a method of using an optical flow, and the like, but there is a problem that the cost of a system for achieving these methods increases.

In order to solve such a problem, the movement speed estimation device 10 according to the present example embodiment includes the body length calculation unit 11, the movement amount calculation unit 12, and the estimation unit 13, and operates as described above with reference to FIGS. 1 to 4B, for example. That is, the body length calculation unit 11 calculates an apparent body length in the video of the specific portion of the cultivated fish 200 obtained by imaging the cultivated fish 200 (aquatic organism). The movement amount calculation unit 12 calculates an apparent movement amount in the video by which the cultivated fish 200 has moved in a predetermined period of the video. Then, the estimation unit 13 estimates a movement speed of the cultivated fish 200 based on the apparent body length and the apparent movement amount.

That is, the movement speed estimation device 10 according to the present example embodiment estimates the movement speed of the cultivated fish 200 as the ratio of the apparent movement amount by which the cultivated fish 200 has moved with respect to the apparent body length of the cultivated fish 200 obtained from the image captured by the camera 201 or 202 which is a general monocular camera, and thus, does not require expensive equipment such as a stereo camera and does not require complicated information processing. As a result, the movement speed estimation device 10 can estimate the movement speed of the aquatic organism with a simple configuration.

In addition, for example, as exemplified in FIG. 3, in a case where only two feature points of the cultivated fish 200 are extracted in a case where the body of the cultivated fish 200 bends, the apparent body length of the cultivated fish 200 to be calculated has a different value depending on the degree of bend, and thus the accuracy of calculating the apparent body length decreases. On the other hand, the movement speed estimation device 10 according to the present example embodiment extracts equal to or more than three feature points arranged along a direction in which the body of the cultivated fish 200 is formed, and then calculates a total sum of the distances between two adjacent feature points as the apparent body length of the cultivated fish 200. As a result, the movement speed estimation device 10 calculates the apparent body length of the organism with high accuracy regardless of the movement direction of the organism in the three-dimensional space even in a case where the posture of the aquatic organism when swimming has a complicated shape, in such a way that the movement speed of the organism can be estimated with high accuracy.

In addition, the feeding determination device 100 according to the present example embodiment determines whether to end feeding based on the movement speed at the normal time before the feeding to the cultivated fish 200 is started and the movement speed at the time of feeding after the feeding is started. Such determination by the feeding determination device 100 is based on the characteristic of the cultivated fish 200 that the movement speed becomes faster than the normal time when feeding is started, and the movement speed returns to the normal time after becoming a satiated state. Thus, the feeding determination device 100 can appropriately determine the timing to end feeding to the aquatic organism with a simple configuration.

In addition, the organism that moves in the water targeted by the movement speed estimation device 10 may be, for example, an organism bred in an aquarium, other than the cultivated fish 200 such as mackerel, yellowtail, and tuna, and may be an organism having a characteristic that the movement speed returns to a normal time after becoming a satiated state.

Second Example Embodiment

FIG. 5 is a block diagram illustrating a configuration of a movement speed estimation system 3 according to a second example embodiment of the present disclosure. The movement speed estimation system 3 roughly includes a movement speed estimation device 30 and a monocular camera 34. The movement speed estimation device 30 includes a body length calculation unit 31, a movement amount calculation unit 32, and an estimation unit 33. However, the body length calculation unit 31, the movement amount calculation unit 32, and the estimation unit 33 are examples of a body length calculation unit, a movement amount calculation unit, and an estimation unit in this order.

The body length calculation unit 31, the movement amount calculation unit 32, and the estimation unit 33 according to the present example embodiment have functions equal to the functions or a part of the functions of the body length calculation unit 11, the movement amount calculation unit 12, and the estimation unit 13 in this order according to the first example embodiment described above.

The body length calculation unit 31 calculates an apparent body length 310 in a video 340 of a specific portion of an aquatic organism from the video 340 obtained by imaging the aquatic organism with a monocular camera 34. The aquatic organism is, for example, the cultivated fish 200 according to the first example embodiment. As in the case of the cultivated fish 200 according to the first example embodiment, for example, the specific portion of the aquatic organism is a portion from a head to a tail, a portion between an eye and a fin, or the like. For example, the body length calculation unit 31 calculates the apparent body length 310 of the specific portion of the aquatic organism by using information indicating a feature point of the aquatic organism extracted by the function associated to the extraction unit 14 according to the first example embodiment included in the movement speed estimation device 30.

The movement amount calculation unit 32 calculates an apparent movement amount 320 in the video 340 of the aquatic organism in a predetermined period of the video 340. The movement amount calculation unit 32 uses, for example, information indicating the feature point of the aquatic organism extracted by the function associated to the extraction unit 14 according to the first example embodiment included in the movement speed estimation device 30 to calculate a distance by which the feature point of the aquatic organism has moved in the predetermined period of the video 340 as the apparent movement amount 320.

The estimation unit 33 estimates a movement speed of the aquatic organism based on the apparent body length 310 and the apparent movement amount 320. When estimating the movement speed of the aquatic organism, the estimation unit 33 uses, for example, a ratio between the apparent body length 310 and the apparent movement amount 320.

The movement speed estimation device 30 according to the present example embodiment can estimate the movement speed of the aquatic organism with a simple configuration. This is because the movement speed estimation device 30 calculates the apparent body length 310 of the aquatic organism and the apparent movement amount 320 by which the aquatic organism has moved in the video 340 obtained by imaging the aquatic organism, and estimates the movement speed of the aquatic organism based on the apparent body length 310 and the apparent movement amount 320.

Third Example Embodiment

Figure 6:
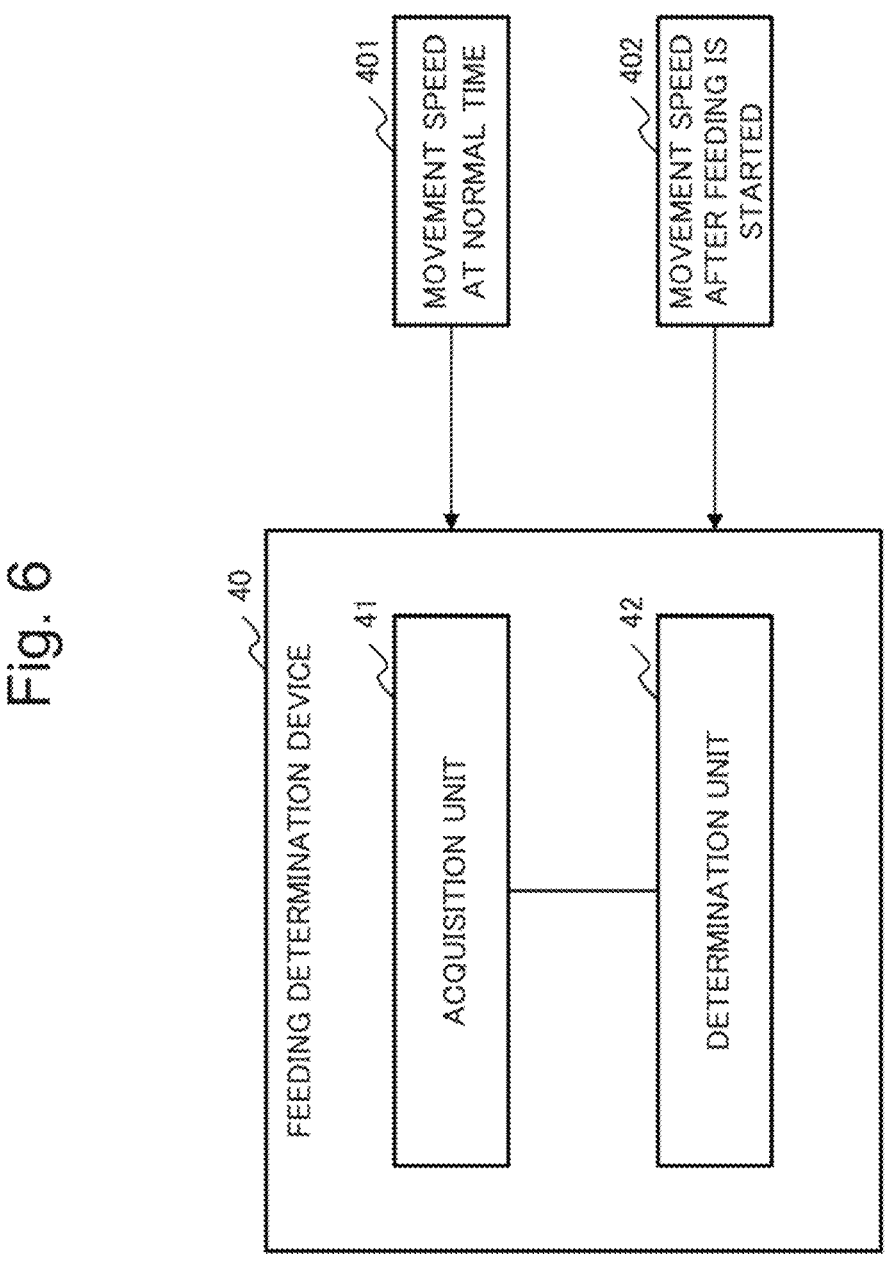
FIG. 6 is a block diagram illustrating a configuration of a feeding determination device 40 according to a third example embodiment of the present disclosure.

FIG. 6 is a block diagram illustrating a configuration of a feeding determination device 40 according to a third example embodiment of the present disclosure. The feeding determination device 40 includes an acquisition unit 41 and a determination unit 42. However, the acquisition unit 41 and the determination unit 42 are examples of an acquisition unit and a determination unit in this order.

The acquisition unit 41 acquires a movement speed 401 at the normal time of the aquatic organism and a movement speed 402 after feeding to the aquatic organism is started. For example, the acquisition unit 41 may acquire the movement speed 401 at the normal time and the movement speed 402 after feeding is started from a device (not illustrated in FIG. 6) that performs the same processing as the body length calculation unit 11, the movement amount calculation unit 12, the estimation unit 13, and the extraction unit 14 according to the first example embodiment.

Similarly to the first example embodiment, in a case where interruption and resume of the feeding are repeatedly performed, the acquisition unit 41 may acquire a movement speed of the aquatic organism after the feeding is interrupted as the movement speed 402 after the feeding is started.

The determination unit 42 determines whether to end feeding based on the movement speed 401 at the normal time and the movement speed 402 after the feeding is started. For example, the determination unit 42 determines whether to end feeding according to a procedure similar to that of the determination unit 15 according to the first example embodiment. That is, for example, the determination unit 42 determines whether the movement speed 401 at the normal time is equal to the movement speed 402 after the feeding is started, and determines to end feeding when the movement speed 401 at the normal time and the movement speed 402 after the feeding is started are equal.

The determination unit 42 may transmit the determination result to a device such as the automatic feeder 203 according to the first example embodiment, or may present the determination result to a breeding staff or the like performing feeding by using a display device, a sound output device, or the like (not illustrated).

The feeding determination device 40 according to the present example embodiment can appropriately determine the timing to end feeding to the aquatic organism with a simple configuration. The reason is that the feeding determination device 40 determines the timing to end feeding by using the characteristic related to the movement speed 401 at the normal time and the movement speed 402 after the feeding is started, which are the criteria for determining whether the aquatic organism is in the satiated state.

<Hardware Configuration Example>

Each unit in the movement speed estimation device 10 or the feeding determination device 100 illustrated in FIG. 1, the movement speed estimation device 30 illustrated in FIG.

5, or the feeding determination device 40 illustrated in FIG. 6 in each of the above-described example embodiments can be achieved by dedicated hardware (HW) (electronic circuit). In addition, in FIGS. 1, 5, and 6, at least the following configuration can be regarded as a function (processing) unit (software module) of a software program.

body length calculation units 11 and 31,
movement amount calculation units 12 and 32,
estimation units 13 and 33,
an extraction unit 14,
determination units 15 and 42,
a control unit 120, and
an acquisition unit 41.

However, the division of each unit illustrated in the drawing is a configuration for the convenience of description, and various configurations can be assumed at the time of implementation. An example of a hardware environment in this case will be described with reference to FIG. 7.

FIG. 7 is a diagram exemplarily describing a configuration of an information processing device 900 (computer) capable of executing the movement speed estimation device 10 or the feeding determination device 100 according to the first example embodiment of the present disclosure, the movement speed estimation device 30 according to the second example embodiment, or the feeding determination device 40 according to the third example embodiment. That is, FIG. 7 illustrates a configuration of a computer (information processing device) capable of achieving the movement speed estimation devices 10 and 30 and the feeding determination devices 100 and 40 illustrated in FIGS. 1, 5, and 6, and illustrates a hardware environment capable of achieving each function in the above-described example embodiments.

The information processing device 900 illustrated in FIG. 7 includes the following components as components, but may not include some of the following components.

a central processing unit (CPU) 901,
a read only memory (ROM) 902,
a random access memory (RAM) 903,
a hard disk (storage device) 904,
a communication interface 905 with an external device,
a bus 906 (communication line),
a reader/writer 908 capable of reading and writing data stored in
a recording medium 907 such as a compact disc read only memory (CD-ROM), and
an input/output interface 909 such as a monitor, a speaker, and a keyboard.

That is, the information processing device 900 including the above-described components is a general computer to which these components are coupled via the bus 906. The information processing device 900 may include a plurality of CPUs 901 or may include a CPU 901 configured by multiple cores. The information processing device 900 may include a graphical processing unit (GPU) (not illustrated) in addition to the CPU 901.

Then, the present disclosure described by using the above-described example embodiments as an example supplies a computer program capable of achieving the following functions to the information processing device 900 illustrated in FIG. 7. The function is the above-described configuration in the block configuration diagram (FIGS. 1, 5, and 6) referred to in the description of the example embodiments or the function of the flowchart (FIGS. 4A and 4B). Thereafter, the present disclosure is achieved by reading, interpreting, and executing the computer program on the CPU 901 of the hardware. The computer program supplied into the device may be stored in a readable/writable volatile memory (RAM 903) or a nonvolatile storage device such as the ROM 902 or the hard disk 904.

Furthermore, in the above case, a general procedure can be adopted at present as a method of supplying the computer program into the hardware. Examples of the procedure include a method of installing the program in the device via various recording media 907 such as a CD-ROM, a method of downloading the program from the outside via a communication line such as the Internet, and the like. In such a case, the present disclosure can be understood to be constituted by a code constituting the computer program or the recording medium 907 storing the code.

The disclosure has been particularly shown and described above by using the above-described embodiments as exemplary examples. However, the disclosure is not limited to the above-described embodiments. That is, it will be understood by those of ordinary skill in the art that various aspects may be applied therein without departing from the spirit and the scope of the present disclosure as defined by the claims.

Note that some or all of the above-described example embodiments can also be described as the following supplementary notes. However, the present disclosure exemplarily described by the above-described example embodiments is not limited to the following.

(Supplementary Note 1)

A movement speed estimation device including:

a body length calculation unit for calculating, from a video obtained by imaging an aquatic organism with a monocular camera, an apparent body length in the video of a specific portion of the aquatic organism;

a movement amount calculation unit for calculating an apparent movement amount in the video of the aquatic organism in a predetermined period of the video; and an estimation unit for estimating a movement speed of the aquatic organism based on the body length and the movement amount.

(Supplementary Note 2)

The movement speed estimation device according to Supplementary Note 1, in which the estimation unit estimates the movement speed of the aquatic organism by using a ratio between the body length and the movement amount.

(Supplementary Note 3)

The movement speed estimation device according to Supplementary Note 1 or 2, further including:

an extraction unit for extracting at least one of a head, a tail, an eye, and a fin of the aquatic organism as a feature point of the aquatic organism.

(Supplementary Note 4)

The movement speed estimation device according to Supplementary Note 1 or 2, further including:

an extraction unit for selecting, from the video obtained by imaging a plurality of the aquatic organisms, at least one of the aquatic organisms and extracting a feature point with respect to each of the selected specific aquatic organisms, in which the body length calculation unit calculates the body length for each of the specific aquatic organisms, the movement amount calculation unit calculates the movement amount for each of the specific aquatic organisms, and the estimation unit estimates the movement speed for each of the specific aquatic organisms.

(Supplementary Note 5)

The movement speed estimation device according to any one of Supplementary Notes 1 to 4, in which the aquatic organism is a cultivated fish.

(Supplementary Note 6)

A feeding determination device including:

the movement speed estimation device according to any one of Supplementary Notes 1 to 5; and a determination unit for determining whether to end feeding based on the movement speed at a normal time of the aquatic organism and the movement speed after the feeding to the aquatic organism is started, in which the estimation unit of the movement speed estimation device estimates the movement speed after the feeding is started.

(Supplementary Note 7)

The feeding determination device according to Supplementary Note 6, in which the determination unit determines to end the feeding when the movement speed at the normal time is equal to the movement speed after the feeding is started.

(Supplementary Note 8)

The feeding determination device according to Supplementary Note 6 or 7, in which the estimation unit estimates the movement speed after the feeding is interrupted as the movement speed after the feeding is started, when interruption and resume of the feeding are repeatedly performed.

(Supplementary Note 9)

The feeding determination device according to any one of Supplementary Notes 6 to 8, in which the estimation unit estimates the movement speed after the feeding is started for each of a plurality of the aquatic organisms, and the determination unit determines to end the feeding when the movement speed at the normal time and the movement speed after the feeding is started to the plurality of aquatic organisms satisfy a criterion.

(Supplementary Note 10)

The feeding determination device according to Supplementary Note 9, in which the determination unit determines to end the feeding when a proportion of aquatic organisms of which the movement speed at the normal time is equal to the movement speed after the feeding is started, among the plurality of aquatic organisms, satisfies a criterion.

(Supplementary Note 11)

The feeding determination device according to Supplementary Note 9, in which the determination unit calculates an average value of movement speeds after the feeding to the plurality of aquatic organisms is started, and determines to end the feeding when the average value satisfies the criterion.

(Supplementary Note 12)

A movement speed estimation system including:

the movement speed estimation device according to any one of Supplementary Notes 1 to 5; and a monocular camera.

(Supplementary Note 13)

A feeding control system including:

the feeding determination device according to any one of Supplementary Notes 6 to 11;

a monocular camera; and a feeder unit for executing the feeding in accordance with a determination result by the determination unit.

(Supplementary Note 14)

A movement speed estimation method, executed by a computer, including:

calculating, from a video obtained by imaging an aquatic organism with a monocular camera, an apparent body length in the video of a specific portion of the aquatic organism;

calculating an apparent movement amount in the video of the aquatic organism in a predetermined period of the video; and estimating a movement speed of the aquatic organism based on the body length and the movement amount.

(Supplementary Note 15)

A recording medium storing a movement speed estimation program causing a computer to execute:

body length calculation processing of calculating, from a video obtained by imaging an aquatic organism with a monocular camera, an apparent body length in the video of a specific portion of the aquatic organism;

movement amount calculation processing of calculating an apparent movement amount in the video of the aquatic organism in a predetermined period of the video; and estimation processing of estimating a movement speed of the aquatic organism based on the body length and the movement amount.

(Supplementary Note 16)

A feeding determination device including:

an acquisition unit for acquiring a movement speed at a normal time of an aquatic organism and a movement speed after feeding to the aquatic organism is started; and a determination unit for determining whether to end the feeding based on the movement speed at the normal time and the movement speed after the feeding is started.

(Supplementary Note 17)

The feeding determination device according to Supplementary Note 16, in which the determination unit determines to end the feeding when the movement speed at the normal time is equal to the movement speed after the feeding is started.

(Supplementary Note 18)

The feeding determination device according to Supplementary Note 16 or 17, in which the acquisition unit acquires a movement speed of the aquatic organism after the feeding is interrupted as the movement speed after the feeding is started when interruption and resume of the feeding are repeatedly performed.

(Supplementary Note 19)

A feeding determination method, executed by a computer, including:

acquiring a movement speed at a normal time of an aquatic organism and a movement speed after feeding to the aquatic organism is started; and determining whether to end the feeding based on the movement speed at the normal time and the movement speed after the feeding is started.

(Supplementary Note 20)

A recording medium storing a feeding determination program for causing a computer to execute:

acquisition processing of acquiring a movement speed at a normal time of an aquatic organism and a movement speed after feeding to the aquatic organism is started; and determination processing of determining whether to end the feeding based on the movement speed at the normal time and the movement speed after the feeding is started.

REFERENCE SIGNS LIST 1 feeding control system
10 movement speed estimation device
11 body length calculation unit
12 movement amount calculation unit
13 estimation unit
14 extraction unit
100 feeding determination device
110 determination unit
120 control unit
20 water tub
200 cultivated fish
201 camera
202 camera
203 automatic feeder
3 movement speed estimation system
30 movement speed estimation device
31 body length calculation unit
310 apparent body length
32 movement amount calculation unit
320 apparent movement amount
33 estimation unit
34 monocular camera
340 video
40 feeding determination device
41 acquisition unit
42 determination unit
401 movement speed at a normal time
402 movement speed after feeding is started
900 information processing device
901 CPU
902 ROM
903 RAM
904 hard disk (storage device)
905 communication interface
906 bus
907 recording medium
908 reader/writer
909 input/output interface

What is claimed is:

1. A device comprising:
a memory storing instructions; and
one or more processors configured to execute the instructions to:
  calculate, from a video obtained by imaging an aquatic organism with a monocular camera, an apparent body length in the video of a specific portion of the aquatic organism;
  calculate an apparent movement amount in the video of the aquatic organism in a predetermined period of the video;
  estimate a movement speed of the aquatic organism based on the body length and the movement amount;
  estimate the movement speed after feeding to the aquatic organism is started;
  determine whether to end feeding based on the movement speed at a normal time of the aquatic organism and the movement speed after the feeding to the aquatic organism is started;
  estimate a movement speed after the feeding is started for each of a plurality of the aquatic organisms;

determine to end the feeding when the movement speed at the normal time and the movement speed after the feeding is started to the plurality of the aquatic organisms satisfy a criterion; and
  calculate an average value of movement speeds after the feeding to the plurality of aquatic organisms is started, and determine to end the feeding when the average value satisfies the criterion.

2. The device according to claim 1, wherein the one or more processors are further configured to execute the instructions to:
  estimate the movement speed of the aquatic organism by using a ratio between the body length and the movement amount.

3. The device according to claim 1, wherein the one or more processors are further configured to execute the instructions to:
  extract at least one of a head, a tail, an eye, and a fin of the aquatic organism as a feature point of the aquatic organism.

4. The device according to claim 1, wherein the one or more processors are further configured to execute the instructions to:
  select, from the video obtained by imaging a plurality of the aquatic organisms, at least one of the aquatic organisms and extract a feature point with respect to each of the selected specific aquatic organisms;
  calculate the body length for each of the specific aquatic organisms;
  calculate the movement amount for each of the specific aquatic organisms; and
  estimate the movement speed for each of the specific aquatic organisms.

5. The device according to claim 1, wherein the aquatic organism is a cultivated fish.

6. The device according to claim 1, wherein the one or more processors are further configured to execute the instructions to:
  determine to end the feeding when the movement speed at the normal time is equal to the movement speed after the feeding is started.

7. The device according to claim 1, wherein the one or more processors are further configured to execute the instructions to:
  estimate the movement speed after the feeding is interrupted as the movement speed after the feeding is started, when interruption and resume of the feeding are repeatedly performed.

8. The device according to claim 1, wherein the one or more processors are further configured to execute the instructions to:
  determine to end the feeding when a proportion of aquatic organisms of which the movement speed at the normal time is equal to the movement speed after the feeding is started, among the plurality of aquatic organisms, satisfies a criterion.

9. A movement speed estimation system comprising:
the device according to claim 1; and
the monocular camera.

10. A feeding control system comprising:
the device according to claim 1;
the monocular camera; and
a feeder performing feeding in accordance with a determination result by the device.

11. The device according to claim 1, wherein the one or more processors are further configured to execute the instructions to:

perform decision making that treats a movement speed at a time of feeding as equal to a movement speed at a normal time when a difference between the two falls within a predetermined range.

12. The device of claim 3, wherein the extracting the feature point uses a learned model generated by machine learning.

13. A movement speed estimation method, executed by a computer, the movement speed estimation method comprising:

calculating, from a video obtained by imaging an aquatic organism with a monocular camera, an apparent body length in the video of a specific portion of the aquatic organism;

calculating an apparent movement amount in the video of the aquatic organism in a predetermined period of the video;

estimating a movement speed of the aquatic organism based on the body length and the movement amount;

estimating the movement speed after feeding to the aquatic organism is started;

determining whether to end feeding based on the movement speed at a normal time of the aquatic organism and the movement speed after the feeding to the aquatic organism is started;

estimating a movement speed after the feeding is started for each of a plurality of the aquatic organisms;

determining to end the feeding when the movement speed at the normal time and the movement speed after the feeding is started to the plurality of the aquatic organisms satisfy a criterion; and calculating an average value of movement speeds after the feeding to the plurality of aquatic organisms is started, and determine to end the feeding when the average value satisfies the criterion.

14. A non-transitory recording medium storing a program causing a computer to execute:

body length calculation processing comprising calculating, from a video obtained by imaging an aquatic organism with a monocular camera, an apparent body length in the video of a specific portion of the aquatic organism;

movement amount calculation processing comprising calculating an apparent movement amount in the video of the aquatic organism in a predetermined period of the video; and estimation processing comprising estimating a movement speed of the aquatic organism based on the body length and the movement amount;

estimation processing comprising estimating the movement speed after feeding to the aquatic organism is started;

determination processing comprising determining whether to end feeding based on the movement speed at a normal time of the aquatic organism and the movement speed after the feeding to the aquatic organism is started;

estimation processing comprising estimating a movement speed after the feeding is started for each of a plurality of the aquatic organisms;

determination processing comprising determining to end the feeding when the movement speed at the normal time and the movement speed after the feeding is started to the plurality of the aquatic organisms satisfy a criterion; and calculation processing comprising calculating an average value of movement speeds after the feeding to the plurality of aquatic organisms is started, and determine to end the feeding when the average value satisfies the criterion.

* * * * *